(12) United States Patent
Bethel et al.

(10) Patent No.: US 9,231,438 B2
(45) Date of Patent: Jan. 5, 2016

(54) AIRBORNE POWER SYSTEM DISCONNECT SYSTEM AND METHOD

(75) Inventors: Jeffrey D. Bethel, Albuquerque, NM (US); Peter Lyons, Albuquerque, NM (US)

(73) Assignee: Aspen Avionics, Inc., Albuquerque, NM (US)

( * ) Notice: Subject to any disclaimer, the term of this patent is extended or adjusted under 35 U.S.C. 154(b) by 215 days.

(21) Appl. No.: 12/243,584

(22) Filed: Oct. 1, 2008

(65) Prior Publication Data
US 2010/0079003 A1    Apr. 1, 2010

(51) Int. Cl.
*H02J 9/04* (2006.01)
*H02J 9/06* (2006.01)

(52) U.S. Cl.
CPC .............. *H02J 9/06* (2013.01); *B64D 2221/00* (2013.01); *Y10T 307/625* (2015.04)

(58) Field of Classification Search
CPC ...................................... H02J 9/04; H02J 9/06
USPC ............................................ 307/64, 9.1–10.1
See application file for complete search history.

(56) References Cited

U.S. PATENT DOCUMENTS

| | | | |
|---|---|---|---|
| 3,831,036 A * | 8/1974 | Pelabon ........................... 307/64 |
| 4,044,293 A * | 8/1977 | Follmer ........................... 320/123 |
| 4,127,847 A | 11/1978 | Stifter |
| 4,400,626 A * | 8/1983 | Lacy ................................. 307/66 |
| 4,412,137 A * | 10/1983 | Hansen et al. .................. 307/10.6 |
| 4,419,588 A * | 12/1983 | Goiset ..................... B64D 47/00 307/18 |
| 4,539,843 A * | 9/1985 | Wise .......................... G01P 3/62 73/179 |
| 4,645,940 A * | 2/1987 | Wertheim ......................... 307/66 |
| 4,697,091 A * | 9/1987 | Tamura ............................ 290/45 |
| 4,791,349 A | 12/1988 | Minks |
| 5,194,757 A * | 3/1993 | Wertheim ......................... 307/87 |
| 5,210,685 A * | 5/1993 | Rosa ............................... 363/109 |
| 5,321,389 A * | 6/1994 | Meister .......................... 340/455 |
| 5,461,262 A * | 10/1995 | Hirasawa et al. ............. 307/10.1 |
| 5,825,100 A * | 10/1998 | Kim ................................. 307/66 |
| 5,844,325 A | 12/1998 | Waugh et al. |
| 5,844,329 A * | 12/1998 | Bailey et al. .................... 307/66 |
| 5,939,800 A * | 8/1999 | Artinian et al. ................. 307/64 |
| 6,150,796 A * | 11/2000 | Ford ............................... 320/128 |
| 6,384,573 B1 | 5/2002 | Dunn |
| 6,420,801 B1 * | 7/2002 | Seefeldt .......................... 307/64 |
| 6,486,568 B1 * | 11/2002 | King et al. ....................... 307/66 |
| 6,744,149 B1 * | 6/2004 | Karuppana et al. ............. 307/31 |
| 6,747,368 B2 * | 6/2004 | Jarrett, Jr. ........................ 307/31 |
| 6,784,624 B2 * | 8/2004 | Buonocunto ................. 315/247 |
| 6,849,967 B2 * | 2/2005 | Lathrop et al. .................. 307/64 |
| 6,957,048 B2 * | 10/2005 | Formenti ...................... 455/90.1 |
| 7,015,404 B2 * | 3/2006 | Sodemann et al. ......... 200/51.11 |
| 7,061,139 B2 * | 6/2006 | Young et al. .................... 307/45 |
| 7,170,194 B2 * | 1/2007 | Korcharz ................. H02J 1/10 307/21 |
| 7,378,756 B2 * | 5/2008 | Singer et al. ......... H01R 13/652 307/140 |
| 7,388,349 B2 * | 6/2008 | Elder et al. .................... 320/104 |
| 7,569,949 B2 * | 8/2009 | Lathrop et al. .................. 307/64 |
| 7,638,896 B2 * | 12/2009 | Ozaki ............................. 307/9.1 |
| 7,800,248 B2 * | 9/2010 | Kramer et al. ................... 307/65 |
| 2002/0024426 A1 * | 2/2002 | Latham et al. ........... 340/310.02 |
| 2003/0118891 A1 * | 6/2003 | Saito et al. ....................... 429/62 |
| 2003/0168913 A1 * | 9/2003 | Kinnard .................... H02J 1/10 307/29 |

(Continued)

*Primary Examiner* — Adi Amrany
(74) *Attorney, Agent, or Firm* — Kutak Rock LLP; Bryan P. Stanley

(57) ABSTRACT

An system and method to automatically disconnect a retrofit electrical unit from an electrical system in the event of an emergency situation and maintain power to the retrofit electrical unit.

20 Claims, 1 Drawing Sheet

(56) References Cited

U.S. PATENT DOCUMENTS

| | | | |
|---|---|---|---|
| 2004/0192407 A1* | 9/2004 | Formenti | 455/572 |
| 2005/0035741 A1* | 2/2005 | Elder et al. | 320/116 |
| 2005/0046396 A1* | 3/2005 | Patterson | 322/28 |
| 2006/0028069 A1* | 2/2006 | Loucks et al. | 307/130 |
| 2006/0277555 A1* | 12/2006 | Howard et al. | 720/600 |
| 2007/0103004 A1* | 5/2007 | Chou et al. | 307/64 |
| 2007/0205604 A1* | 9/2007 | Heidebrink | 290/40 C |
| 2007/0221422 A1* | 9/2007 | Rosenstock | 180/65.3 |
| 2008/0162044 A1* | 7/2008 | Koutari | 701/213 |
| 2008/0180263 A1* | 7/2008 | Lathrop et al. | 340/635 |
| 2008/0238201 A1* | 10/2008 | Oliver et al. | 307/43 |
| 2009/0214563 A1* | 8/2009 | Kirchhofer et al. | 424/145.1 |

* cited by examiner

AIRBORNE POWER SYSTEM DISCONNECT SYSTEM AND METHOD

BACKGROUND

1. Field of the Invention

The present general inventive concept relates to system power switching and, more particularly, to system and method of switching power provided to an electronic aircraft system.

2. Description of the Related Art

Aircrafts utilize a combination of mechanical and electrically based instrumentation to convey the state of the aircraft to the pilot or flight crew. Mechanically based instruments typically use fluid pressure, such as air, oil, and fuel, to cause deflections in needles located within instrument housings located in the cockpit to indicate the corresponding state of a system on the aircraft. Electrically based instruments typically use solid-state sensors to convert mechanical forces into electrical signals, which can then be displayed on various types of equipment located within the cockpit.

Aircraft also make extensive use of electronic instrumentation systems for purposes of navigation, communication, and surveillance.

Smaller, lighter aircraft types, which are typically referred to as "general aviation aircraft", have electrically based systems are typically powered by a 14 or 28 volt direct current ("DC") power source. These power systems typically include a battery, a power generation mechanism attached to the aircraft's engine(s), and a voltage regulator. Energy provided by the running engine is used to both power electrical devices on the aircraft and maintain the charged state of the battery. When the engine is not running, energy is obtained solely from the battery. The regulator is used to maintain a constant voltage level regardless of the engine speed. A single, sealed lead-acid battery, a regulator, and an automotive style alternator is a commonly employed configuration.

The alternator functions by converting mechanical energy created by the engine into electrical energy by spinning the shaft on the alternator, which creates electrical power by inducing voltages and currents into coil windings. During normal engine operation, this electrical power is regulated to a voltage such as 13.2 to 14.4 volts, which is slightly higher than the normal quiescent voltage of a lead acid battery. This elevated voltage level is sufficient to charge the lead acid battery. When this charge voltage is removed. i.e. the engine stops or the alternator fails, the lead acid battery voltage returns to a slightly lower voltage such as 12.6 to 12.8 volts.

Because the battery is directly tied to the overall electrical supply system for the aircraft, the voltage of the overall electrical system of the aircraft directly reflects whether the alternator is actively capable of generating power based entirely on the voltage of the aircraft's electrical system. This voltage can be used as an indicator of the aircraft's electrical system health, and indicate whether a failure has occurred.

Because of the relatively high energy density requirements and the mechanical nature of the engine and alternator, aircraft with this type of electrical system are highly susceptible to loss of electrical generation ability. Wiring, alternator, and regulator failures are a fairly regular occurrence in general aviation aircraft. This is especially true for older aircraft that are retrofitted with additional electrically based avionics that place an additional strain on very old electrical components.

For single engine aircraft, loss of the one engine is also sufficient to cause loss of electrical generation capability. For twin engine aircraft, loss of both engines is typically required for loss of electrical generation capability. In multiple engine aircraft, loss of electrical generation capability is typically related to common-mode failures, and may occur due to fuel starvation, fuel contamination, or other factors. Some aircraft support an air-driven electrical generator, but this configuration is not common given the additional weight, cost, and complexity of these systems.

When power generation capability is lost, the aircraft's electrically based systems must be powered solely from the aircraft's battery. When this occurs, it is a common practice to reduce or shut down power to or "load-shed" non required systems. This is implemented by turning off such systems such as entertainment equipment and other non-essential loads such as cabin lights, and air conditioning. Items that are required for the continued safe flight and landing of the aircraft are considered "essential loads" and cannot be turned off under these circumstances.

The objective of the load-shedding exercise is to reduce the overall power consumption of the aircraft such that essential loads or critical systems can continue to operate until such time that the aircraft can be safely landed. Thirty (30) minutes is industry-accepted minimum time period for general aviation aircraft. To achieve this time objective, the aircraft manufacturer must design the capacity of the electrical charge system, battery size, and wiring in consideration of the required loads for a given avionics system installed on the aircraft.

The architecture of these aircraft systems makes it more difficult to add electrically based equipment to the aircraft, and a new load analysis must be performed to ensure that adequate battery power reserve is still provided as each new piece of equipment is added. Performing a load analysis is very difficult and time consuming. It may also result in the requirement to increase the size of the battery, which may increase the size, cost, and weight of related components.

Modification of the battery may be required especially in the scenario where essential systems that are electrical in nature are being added. This is typically encountered when a mechanical instrument is being replaced by its electrical equivalent. In this scenario, an additional electrical load is being added to the aircraft, but for a piece of equipment that cannot be load-shed as it is an essential instrument. The replacement of the primary mechanically based attitude, airspeed, and altimeter with an electronic equivalent is an example of this scenario.

Accordingly, there is a demand for a system that allows for the replacement of essential and/or non-essential mechanically based instrumentation with more modern electronically based equipment without effecting the safety margins designed into an aircraft's electrical power generation system, and does not require a new load analysis, upgrading of the aircrafts electrical system, or provisioning for a larger battery.

SUMMARY OF THE INVENTION

The present general inventive concept provides a system and method to automatically decouple an electronic aircraft instrument from a pre-existing electrical system in the aircraft.

The present general inventive concept further provides a system and method to add new electrically operated instrumentation equipment without requiring any upgrades to the existing electrical system in the aircraft.

The present general inventive concept further provides a system and method to add new electrically operated instrumentation equipment without requiring aburdensome electrical load analysis.

The new equipment being added to the aircraft may be a display screen having a plurality of readouts located on the instrument panel. It may also be equipment having no display screen, and be located elsewhere in the aircraft, not visible to the pilot.

In another aspect, the present general inventive concept further provides a method of replacing existing mechanically based primary flight instruments with electrically based equivalents. The electrically based replacement can provide enhanced accuracy, functionality and reliability when compared to the mechanically based equivalents.

In yet another aspect, the present general inventive concept further provides a method of replacing existing electrically based equipment on the aircraft with either equivalent or enhanced electrically based equipment without requiring upgrade of the aircraft's electrical system and/or performing a load analysis.

Some embodiments of the present general inventive concept relate to an electronic display instrument including a body having a front and a back, a display screen connected to the body, an attitude reference system, an air data computer, and/or a navigation display.

The foregoing and/or other aspects and advantages of the present general inventive concept may also be achieved by provides a power control system to control power to an electrical unit, the system including a first battery and a second battery to store power, an alternator to generate power, an electrical component powered by one of the first battery, the second battery, and the alternator, a first switch to selectively connect the electrical component to one of the first battery and the alternator, and a second switch to selectively connect the electrical component to one of the first battery, the alternator, and the second battery.

The present general inventive concept may also include a controller to compare a first factor to a predetermined second factor, and to change a state of the second switch if the first factor is less than the predetermined second factor.

The present general inventive concept may also include a controller to compare a first factor to a predetermined second factor, and to change a state of the second switch if the first factor is greater than the predetermined second factor.

The first switch may be a manual switch and the second switch may be an automatic switch.

The foregoing and/or other aspects and advantages of the present general inventive concept may also be achieved by providing an electrical unit adapted to connect to an electrical system having a primary power source, the electrical unit having a safety means to automatically disconnect the electrical unit from the primary power source if an emergency event occurs, the electrical unit including a controller to monitor and compare a first factor to a predetermined second factor, a switch to electrically connect the electrical unit to the primary power source in a first position and a secondary power source in a second position, wherein if the first factor is less than the predetermined second factor, then the controller generates a signal to move the switch from the first position to the second position.

If the switch is in the second position and the first factor becomes more than the predetermined second factor, the controller may generate another signal to move the switch from the second position to the first position.

The first factor may be an amount of power received from the primary power source.

The electrical unit may be a motor vehicle component.

The present general inventive concept may also include a computer readable recording medium comprising computer readable codes to store and process data for the controller such that the predetermined second factor can be set, the first factor can be monitored, and the signal can be generated to control the switch.

The emergency event may be a decrease in voltage received from the electrical system.

The foregoing and/or other aspects and advantages of the present general inventive concept may also be achieved by providing a method to adapt a retrofit apparatus to an electrical system and to control a transfer of power from the electrical system to the retrofit apparatus, the method including programming a factor into a controller of the retrofit apparatus, monitoring power received from the electrical system to the retrofit apparatus, comparing the power received from the electrical system to the factor, and generating a signal to move a switch from a first position to a second position if the power received falls below the factor.

The second position may connect the retrofit apparatus to a secondary power source contained within the retrofit apparatus.

The present general inventive concept may further include reconnecting the retrofit apparatus to the electrical system if the switch is in the second position and the power received rises above the factor.

The secondary power source may be a battery.

The power received may be continuously monitored.

The factor may be a voltage level of 13.2 volts.

Additional aspect and advantages of the present general inventive concept will be set forth in part in the description which follows and, in part, will be obvious from the description, or may be learned by practice of the general inventive concept.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE INVENTION

Figure 1:
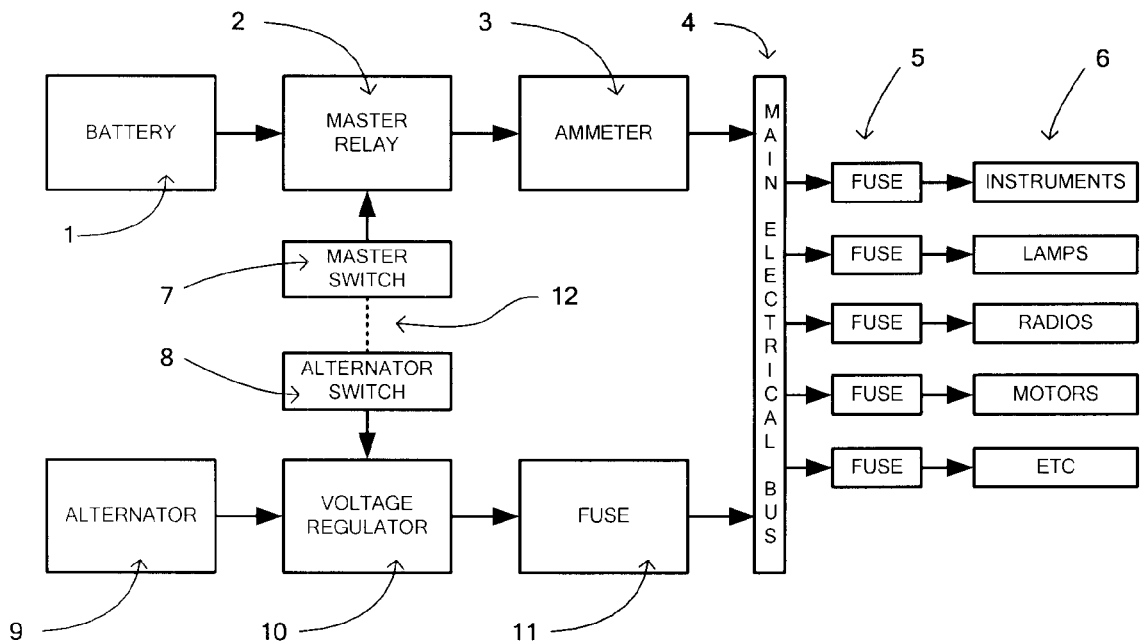
FIG. 1 is a block diagram illustrating generally a system and method provided by the present general inventive concept with electrical retrofit units illustrated generally.

Reference will now be made in detail to the embodiments of the present general inventive concept, examples of which are illustrated in the accompanying drawings, wherein like reference numerals refer to like elements throughout. The embodiments are described below to explain the present general inventive concept by referring to the figures.

Referring to FIG. 1, an electrical charging and distribution system 100 of the present general inventive concept is illustrated. The battery 1 provides a primary means of energy storage. A master relay 2 is controlled by a cockpit mounted switch 7 accessible by a pilot. An action of closing said switch 7 allows the electrical potential stored in the battery 1 to be coupled to main electrical bus 4 through a cockpit mounted ammeter 3. The ammeter 3 allows the pilot to monitor electrical current flow into and/or out of the battery 1.

An engine mounted alternator 9 is physically connected to an aircraft engine (not illustrated) through a belt (not illustrated) or other like mechanism. The resulting rotation of a shaft (not illustrated) of the alternator 9 produces an electrical voltage and current in proportion to a speed of rotation of the shaft.

A voltage regulator 10 is pre-set to a fixed voltage limit, which is sufficient to charge the battery 1 without causing damage to components within the battery 1. The alternator switch 8 is mounted in the cockpit and allows the pilot to control whether the alternator 9 is coupled to the main electrical bus 4 through a safety fuse 11.

When the alternator switch 8 is in an off or closed position, the alternator 9 is effectively disconnected from the main electrical bus 4, and therefore does not supply voltage or current.

The energy from the battery 1 and the alternator 9 are electrically connected together at a common point of the main electrical bus 4. When the master switch 7 and the alternator switch 8 are both in the closed position, energy from the alternator 9 is able to flow to the battery 1 to charge the battery 1.

When the master switch 7 is in the closed position, energy from the battery 1 is able to flow through one or more of a plurality of fuses 5 to power various aircraft components 6. The various aircraft components 6 may include one or more of a variety of items, such as electrically powered instruments, electrically powered lamps, electrically powered radios, electrically powered motors, and the like.

When the alternator switch 8 is in the closed position, energy from the alternator is able to flow through one or more of the plurality of fuses 5 to power one or more of the various aircraft components 6 as described above. Given the common electrical point of the main electrical bus 4 between the battery 1 and the alternator 9, the electrical current flow will be obtained from whichever one of the two energy sources, i.e., the battery 1 or the alternator 9, provides a higher electrical voltage potential.

For example, if the alternator 9 is generating a potential voltage of 10.0 volts and the battery 1 has a potential voltage of 11.0 volts, the current flow to power the various aircraft components 6 will flow from a higher of the two sources, i.e., the battery 1 in this example.

Conversely, if the alternator 9 is generating a potential voltage of 11.0 volts and the battery 1 has a potential voltage of 10.0 volts, the current flow to power the various aircraft components 6 will flow from a higher of the two sources, i.e., the alternator 9 in this example.

The various aircraft components 6 will receive a higher voltage potential of one of the battery 1 or the alternator 9. Under normal circumstances with the aircraft engine (not illustrated) running at normal in-flight revolutions per minute, the alternator 9 is regulated by the said voltage regulator 10 and will output between 13.2 and 14.4 volts DC. This state is referred to as a "normal" state.

The common lead acid battery operates at lower voltages than is required to actively charge the battery. This requires a slightly higher voltage to be applied to the terminals to actively charge the chemistry within the cells. A "normal" voltage output by the alternator 9 and voltage regulator 10 combination is set to a value such that the battery 1 will charge during normal engine operation.

Because of the common voltage maintained at the main electrical bus 4, the various aircraft components 6 have a voltage between 13.2 and 14.4 volts DC applied to their terminals when the alternator 9 is physically spinning at normal speeds.

When the aircraft engine is operating at idle, not operating at all, or the alternator 9 has failed, the various aircraft components 6 have a reduced voltage between 12.6 and 12.8 volts DC applied to their terminals as supplied by the battery 1. This state is referred to as an "abnormal" state.

The system 100 as illustrated in its entirety by FIG. 1 has the characteristic that the battery 1 and alternator 9 are sized correctly and otherwise designed to support the electrical components 6 of the aircraft under consideration. To save weight and cost, there is typically some level of margin built into the system 100, but often additional various aircraft components 6 are added to the system 100 over time that results in an increase on the overall electric load of the system 100.

The system 100 as illustrated in its entirety by FIG. 1 has the distinct disadvantage that when one or more additional aircraft components are added to the various aircraft components 6, a technical analysis referred to as an "electrical load analysis" must be performed to ensure that the battery 1 and alternator 9 are still capable of performing their function with the additional electrical load presented by the one or more additional aircraft components.

The electrical load analysis is undesirable because it is time-consuming and an otherwise burdensome process that requires analyzing the alternator 9 and the battery 1.

The main criteria for the alternator 9 is to determine whether the alternator 9 can provide sufficient current levels to power the various aircraft components 6 during "normal" in-flight operation. If the said alternator 9 becomes undersized for the required load, the voltages will drop on the main electrical bus 4 and sufficient voltage will not be present to charge the battery 1 to sufficient levels.

The main criteria for the battery 1 is to determine whether the battery 1 can provide sufficient energy capacity to power the various aircraft components 6 during "abnormal" in-flight operation. If the battery 1 becomes undersized for the required load, the voltages will drop on the main electrical bus 4 too quickly, and not allow for the time required for continued safe flight and landing.

Addressing the concern of the second criteria above with respect to the battery 1 is the primary objective of the present general inventive concept.

Figure 2:
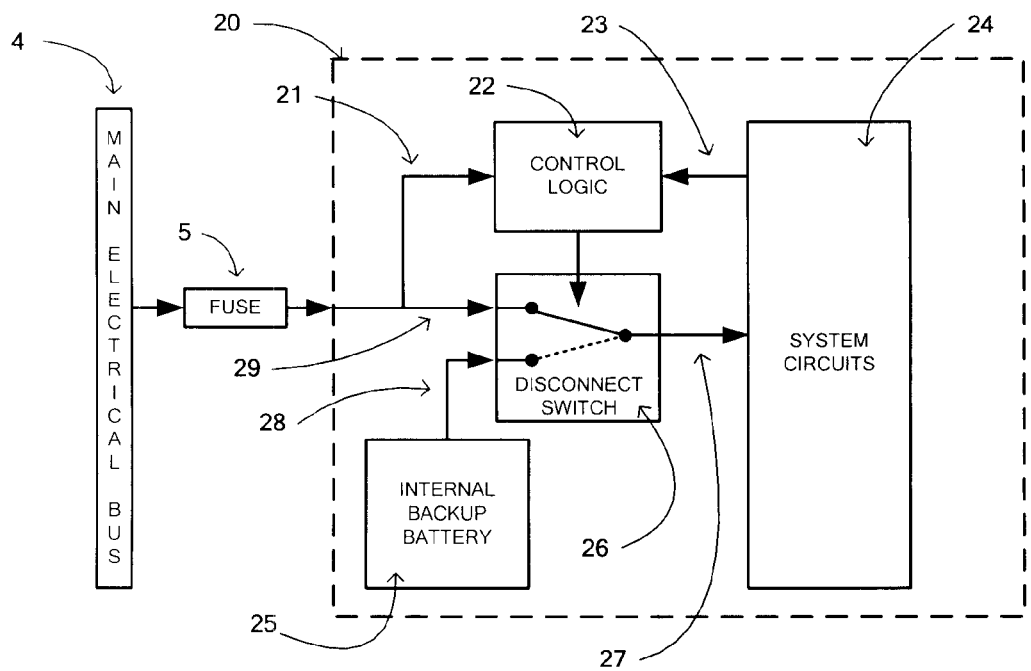
FIG. 2 is a block diagram illustrating a portion of the system and method provided by the present general inventive concept with an electrical retrofit unit illustrated in detail.

Referring to FIG. 2, the main electrical bus 4 and the fuse 5 of the present general inventive concept are illustrated along with a unique control/switching scheme that may be incorporated into one or more of the various aircraft components 6. While FIG. 2 provides a singular electrical component unit 20 for illustrative purposes, it is foreseen that any one or more various aircraft components 6 may be designed such as the electrical component 20. In the exemplary embodiment of the present general inventive concept, all the of the various electrical components 6 are designed such as the electrical component 20.

In the exemplary embodiment of the present general inventive concept, the electrical component unit 20 is a retrofit piece of avionics equipment added to an existing aircraft. It is foreseen, however, that the present general inventive concept may be a non-retrofit piece of avionics that is added to an aircraft during manufacture and assembly of the aircraft.

The electrical component unit 20 includes its own internal backup battery 25, control logic 22, and electrical switch 26 and a remainder of the electrical component unit 20 system circuits 24. Various control paths 21, 23, 27, 28, and 29 are also incorporated to electrically connect various components.

The main objective of the present general inventive concept is to allow the electrical component unit 20 to autonomously and/or automatically switch off of the aircraft's main electrical bus 4 when the alternator 9 fails or the main aircraft's engine stops. The present general inventive concept accomplishes this by continuously monitoring the voltage level presented on control path 21 and comparing the voltage level to the predetermined "normal" and/or "abnormal" levels.

By autonomously switching off of the said main electrical bus 4, the battery 1 does not need to provide the electrical energy required to maintain the continued operation of the system circuits 24. Instead, the electrical energy required to maintain operation is obtained solely from the said internal backup battery 25.

The switching logic resides in the control logic 22, which monitors the electrical voltage as presented from the control path 21. When the voltage drops to a pre-determined threshold and is in the abnormal state, the control logic 22 switches the disconnect switch 26 into a position where the system circuits 24 are electrically disconnected from the main electrical bus 4. Electrical energy to power the system circuits 24 is now obtained through path 28 instead of path 29.

This action effectively removes the system circuits 24 load off of the main aircraft battery 1 in the event of an alternator or engine failure such that the system 100 is running in an abnormal operating state.

Because of this autonomous switching, it is no longer required for the electrical load analysis of the aircraft's electrical system to consider and otherwise compensate for the size of the main aircraft battery 1 for the addition of said electrical component unit 20.

It is foreseen that the system circuits 24 may be re-connected to the main electrical bus 4 if the voltage returns to the normal condition.

It is also foreseen that the system circuits 24 may override the control logic 22 by means of control path 23, which may be utilized for special operating modes and/or changing system behavior. Such overrides may be dependent on external factors, such as but not limited to using one set of logic when the aircraft is on the ground versus using another set of login when the aircraft is airborne.

Various embodiments of the present general inventive concept can be embodied as computer readable codes on a computer readable recording medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

For example, the control logic 22 of the electrical component unit 20 may be embodied in software, in hardware, or in a combination thereof. In various embodiments, the control logic 22 may be embodiment as computer readable codes on a computer readable recording medium to monitor electrical voltage as presented from the control path 21. For instance, the control logic 22 may be programmed with a pre-determined threshold such that when voltage drops to the pre-determined threshold and is in an abnormal state, the control logic 22 generates and transmits a signal to the disconnect switch 26 so that the disconnect switch 26 changes from a first position where the system circuits 24 are electrically connected to the main electrical bus 4 to a second position where the system circuits 24 are electrically disconnected from the main electrical bus 4.

Accordingly, the present general inventive concept allows for the replacement of mechanically based instrumentation with more modern electronically based equipment without effecting the safety margins designed into the aircrafts electrical power generation system and does not require a new load analysis, upgrading of the aircrafts electrical system, or provisioning for a larger battery.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An aircraft comprising a control panel, an electrical system having a primary power source, and an electrical unit selectively electrically connected to the aircraft electrical system, the electrical unit being configured to automatically electrically disconnect system circuits of the electrical unit from the aircraft electrical system and electrically connect the system circuits of the electrical unit to a secondary power source if an emergency event occurs while the aircraft is in flight, the electrical unit further comprising:
   a controller to monitor electrical power associated with the aircraft electrical system so as to determine a first factor; and
   a switch to electrically connect the system circuits of the electrical unit to the aircraft electrical system in a first position and to the secondary power source in a second position,
   wherein the controller compares the first factor to a predetermined second factor; wherein if the first factor is less than the predetermined second factor, then the controller generates a signal to move the switch from the first position to the second position;
   wherein the control panel includes a plurality of systems;
   wherein the electrical unit is one of the systems of the control panel;
   wherein at least some of the systems of the control panel continue to be powered by the aircraft electrical system when said switch is in the second position; and
   wherein said secondary power source is electronically isolated from the aircraft electrical system regardless of which position said switch is in.

2. The electrical unit according to claim 1, wherein said controller monitors electrical power associated with the aircraft electrical system when said switch is in the second position so as to determine a third factor, said controller generating a signal to move the switch from the second position to the first position if the third factor is greater than the predetermined second factor.

3. The electrical unit according to claim 1, wherein the first factor is an amount of power received from the primary power source.

4. The electrical unit according to claim 1, wherein the electrical unit and the secondary power source are supported by the aircraft control panel such that the electrical unit becomes part of the control panel.

5. The electrical unit according to claim 1, further comprising:
   a computer readable recording medium comprising computer readable codes to store and process data for the controller such that the predetermined second factor can be set, the first factor can be monitored, and the signal can be generated to control the switch.

6. The electrical unit according to claim 1, wherein the emergency event is a decrease in voltage received from the electrical system.

7. A method to add a retrofit apparatus to an aircraft, the aircraft comprising a control panel and an electrical system having a primary power source, the method comprising:
   installing the retrofit apparatus onto the control panel of the aircraft;
   electrically connecting a switch of the retrofit apparatus to the electrical system of the aircraft;
      monitoring electrical power from the aircraft electrical system so as to determine a first factor;
   comparing the first factor to a predetermined second factor; and
      generating a signal to move a switch of the retrofit apparatus from a first position to a second position if the first factor is less than the predetermined second factor;
   wherein system circuits of the retrofit apparatus are electrically connected to the aircraft electrical system when said switch is in the first position;
   wherein moving said switch from the first position to the second position disconnects said system circuits of the retrofit apparatus from the aircraft electrical system and connects said system circuits to a secondary power source;
   wherein adding the retrofit apparatus to the aircraft does not require a load analysis; wherein adding the retrofit apparatus to the aircraft would require a load analysis if the retrofit apparatus did not disconnect said system circuits of the retrofit apparatus from the aircraft electrical system when the first factor is less than the predetermined second factor;
   wherein the control panel includes a plurality of systems;
   wherein the installing and the electrically connecting steps cause the retrofit apparatus to become one of the systems of the control panel;
   wherein at least some of the systems of the control panel continue to be powered by the aircraft electrical system when said switch is in the second position; and
   wherein said secondary power source is electronically isolated from the aircraft electrical system regardless of which position said switch is in.

8. The method according to claim 7, further comprising:
   monitoring electrical power from the aircraft electrical system when said switch is in the second position so as to determine a third factor;
   comparing the third factor to the predetermined second factor; and
   generating a signal to move the switch from the second position to the first position so as to reconnect the retrofit apparatus to the electrical system if the switch is in the second position and the third factor is greater than the predetermined second factor.

9. The method according to claim 7, wherein the secondary power source is a battery.

10. The method according to claim 7, wherein electrical power from the aircraft electrical system is continuously monitored.

11. The method according to claim 7, wherein the second factor is a voltage level of 13.2 volts.

12. The method according to claim 7, wherein the retrofit apparatus and the secondary power source are added to the aircraft control panel such that the electrical unit becomes part of the control panel.

13. The method according to claim 7, wherein adding the retrofit apparatus to the aircraft is accomplished after at least one pre-existing apparatus is removed from the aircraft such that the retrofit apparatus replaces at least one pre-existing apparatus and, in so doing, increases the load requirement on the aircraft electrical system.

14. A power control system to control power to an electrical component of an aircraft while the aircraft is in flight, the system comprising:
   a first power source to store power;
   an alternator to generate power, said alternator being connected to said first power source;
   an electrical bus connected to said first power source;
   an electrical switch connected to said electrical bus and to said electrical component so as to selectively connect system circuits of said electrical component to said electrical bus when said electrical switch is located at a first position; and
   a second power source connected to said electrical switch such that said system circuits of said electrical component are connected to said second power source when said electrical switch is located at a second position;
   wherein the aircraft includes a plurality of systems;
   wherein the electrical component is one of the systems of the control panel;
   wherein at least some of the systems of the control panel continue to be powered by the electrical bus when said electrical switch is in the second position; and
   wherein the secondary power source is electronically isolated from the aircraft electrical system regardless of which position said electrical switch is in.

15. The system according to claim 14, further comprising a controller to compare a first factor to a predetermined second factor and to move the electrical switch to the second position if the first factor is less than the predetermined second factor.

16. The system according to claim 14, further comprising a controller to compare a third factor to a predetermined second factor and to move the electrical switch to the first position if the third factor is greater than the predetermined second factor.

17. The system according to claim 14, wherein said switch is an automatic switch.

18. The system according to claim 14, further comprising a voltage level monitoring component, wherein a voltage level on a control path connecting said electrical bus with said switch is continuously monitored and compared to a predetermined voltage level.

19. The system according to claim 18, wherein when said continuously monitored voltage level is greater than said predetermined voltage level, said switch connects the electrical component via said electrical bus to the first power source; and when said continuously monitored voltage level drops to or below said predetermined voltage level, said switch disconnects the electrical component from said electrical bus and connects said electrical component to the second power source.

20. The method according to claim 14, wherein the electrical component and the secondary power source are supported by the aircraft control panel such that the electrical unit is part of the control panel.

* * * * *